US 10,315,895 B2

(12) United States Patent
Friederichs et al.

(10) Patent No.: US 10,315,895 B2
(45) Date of Patent: Jun. 11, 2019

(54) CABLE-CUTTING UNIT FOR A CABLE WINCH, CABLE-CUTTING SYSTEM FOR A CABLE WINCH AND METHOD FOR OPERATING A CABLE-CUTTING UNIT FOR A CABLE WINCH

(71) Applicant: JENOPTIK Advanced Systems GmbH, Wedel (DE)

(72) Inventors: Ralf Friederichs, Hamburg (DE); Joachim Schmidt, Tornesch (DE); Kai Thron, Pinneberg (DE)

(73) Assignee: JENOPTIK Advanced Systems GmbH, Wedel (DE)

(*) Notice: Subject to any disclaimer, the term of this patent is extended or adjusted under 35 U.S.C. 154(b) by 0 days.

(21) Appl. No.: 15/746,752

(22) PCT Filed: Jul. 21, 2016

(86) PCT No.: PCT/EP2016/067408
§ 371 (c)(1),
(2) Date: Jan. 22, 2018

(87) PCT Pub. No.: WO2017/013205
PCT Pub. Date: Jan. 26, 2017

(65) Prior Publication Data
US 2018/0215593 A1    Aug. 2, 2018

(30) Foreign Application Priority Data
Jul. 21, 2015   (DE) ........................ 10 2015 009 278

(51) Int. Cl.
*B66D 1/54* (2006.01)
*B26D 5/08* (2006.01)
(Continued)

(52) U.S. Cl.
CPC ................. *B66D 1/54* (2013.01); *B26D 5/08* (2013.01); *B64D 1/22* (2013.01); *B66D 1/7447* (2013.01)

(58) Field of Classification Search
CPC .......... B66D 1/54; B66D 1/7447; B26D 5/08; B64D 1/22
See application file for complete search history.

(56) References Cited

U.S. PATENT DOCUMENTS

| 1,397,911 A | 11/1921 | Tossizza |
| 3,003,235 A | 10/1961 | Temple et al. |

(Continued)

FOREIGN PATENT DOCUMENTS

| FR | 2 205 470 | 5/1974 |
| GB | 1 289 939 A | 9/1972 |
| WO | WO 2015 020626 A1 | 2/2015 |

OTHER PUBLICATIONS

International Preliminary Report for International Application No. PCT/EP2016/067408 with a filing date of Jul. 21, 2016.
(Continued)

*Primary Examiner* — Omar Flores Sanchez
(74) *Attorney, Agent, or Firm* — Muncy, Geissler, Olds & Lowe, P.C.

(57) ABSTRACT

A cable-cutting unit for a cable winch has at least one cable-cutting device for cutting a cable running through the cable-cutting unit, and also comprises a slide as well as a housing with a cable channel for guiding the cable running through the cable-cutting unit, wherein the cable-cutting device is, or can be, arranged on the slide and the slide is, or can be, arranged on the housing such that it can be displaced, transversely to the cable channel, between a first position and a second position.

13 Claims, 6 Drawing Sheets

(51) Int. Cl.
*B64D 1/22* (2006.01)
*B66D 1/74* (2006.01)

(56) References Cited

U.S. PATENT DOCUMENTS

| | | | |
|---|---|---|---|
| 3,074,320 A | | 1/1963 | Trifonoff |
| 3,240,474 A | | 3/1966 | Garnier |
| 3,290,013 A | | 12/1966 | Walsh et al. |
| 3,624,720 A | * | 11/1971 | Laky ................ B21F 11/00 83/198 |
| 3,810,671 A | * | 5/1974 | Jeffery ............... B60N 3/04 294/82.29 |
| 3,870,255 A | | 3/1975 | Lemont |
| 3,882,748 A | * | 5/1975 | Moore ............... B23D 23/00 114/221 A |
| 10,071,493 B2 | * | 9/2018 | Povroznik, III ...... B26D 5/086 |
| 2003/0205121 A1 | | 11/2003 | Florian et al. |
| 2010/0257983 A1 | * | 10/2010 | Jordan ............... B26D 1/08 83/13 |
| 2013/0098214 A1 | | 4/2013 | Birkeland |
| 2016/0325454 A1 | * | 11/2016 | Povroznik, III ...... B26D 5/086 |

OTHER PUBLICATIONS

International Search Report for Application No. PCT/EP2016/067408 dated Oct. 18, 2016.

* cited by examiner

CABLE-CUTTING UNIT FOR A CABLE WINCH, CABLE-CUTTING SYSTEM FOR A CABLE WINCH AND METHOD FOR OPERATING A CABLE-CUTTING UNIT FOR A CABLE WINCH

This nonprovisional application is a National Stage of International Application No. PCT/EP2016/067408, which was filed on Jul. 21, 2016, and which claims priority to German Patent Application No. 10 2015 009 278.2, which was filed in Germany on Jul. 21, 2015, and which are both herein incorporated by reference.

BACKGROUND OF THE INVENTION

Field of the Invention

The present invention relates to a cable-cutting unit for a cable winch, to a cable-cutting system for a cable winch, and to a method for operating a cable-cutting unit for a cable winch.

Description of the Background Art

Cable winches, so-called rescue winches, are used in rescue helicopters for recovering people in distress. When a hook of the rescue winch that is located on the cable is lowered from a helicopter, situations in which the hook or the cable catches in objects on the ground can arise. This poses a danger to the helicopter and the crew. In order to counteract this situation a rescue winch can be equipped with a cable-cutting device. Such a cable-cutting device has a cutter for example, which for severing the cable is triggered by a propelling charge.

SUMMARY OF THE INVENTION

Against this background, a cable-cutting unit for a cable winch, a cable-cutting system for a cable winch, and a method for operating a cable-cutting unit for a cable winch according to the independent claims are proposed by way of the present invention. Advantageous design embodiments are derived from the respective dependent claims and the description hereunder.

An arrangement of a cable-cutting device for a cable winch on a mechanically displaceable slide provides the potential for laterally displacing the slide with the device after the cable-cutting device has been triggered, such that the cable can be moved out beside the cable-cutting device in an unimpeded manner.

This approach proposed herein can prevent the cable being blocked by virtue of the triggered cutter blade after the cable has been severed and enable the cable to be reeled in in order for a replacement hook to be fitted. A replacement hook can thus be advantageously fastened to the remaining cable during the flight, the operation of the winch can be resumed, and a rescue mission already started can be successfully concluded.

If the helicopter does not have a redundant winch available, the mission has to be aborted and the complete cable has to be replaced on the ground by maintenance personnel once the helicopter has returned. The rescue mission in this instance can only be concluded, or a new rescue mission can only be started, after a fresh take-off.

By way of the concept proposed herein, a cost intensive and heavy second rescue winch in the helicopter can be dispensed with. In particular, the aspect of valuable time being lost in that a rescue mission has to be aborted and the complete cable has to be replaced on the ground by maintenance personnel once the helicopter has returned in order for the rescue mission to be concluded or for a new rescue mission to be commenced after taking off again can be addressed.

A cable-cutting unit for a cable winch has the following features: at least one cable-cutting device for severing a cable running through the cable-cutting unit; a slide; and a housing having a cable duct for guiding the cable running through the cable-cutting unit, wherein the cable-cutting device is disposed or disposable on the slide and the slide is disposed or disposable on the housing so as to be displaceable transversely to the cable duct between a first position and a second position.

The cable winch can be a rescue winch which can be installed, for example, in a helicopter for rescuing persons in distress. The rescue winch can comprise a cable which, equipped with a hook, can be unwound and rewound. The cable-cutting device can be an assembly which is configured for severing the cable, for example as a safety measure when the cable or the hook has been caught.

According to one embodiment, in the first position of the slide the cable-cutting device in relation to a longitudinal extent of the cable duct can be disposed so as to be opposite the cable duct, and in the second position of the slide the cable-cutting device in relation to the longitudinal extent of the cable duct can be disposed so as to be laterally offset in relation to the cable duct. In this way, the cable can advantageously be released for being unwound again after being severed.

According to a further embodiment, the cable-cutting device can have a cutter. The cutter can be configured for penetrating the cable duct laterally in order for the cable to be severed as a response to an activation from an internal region of the cable-cutting device. The cable can be rapidly and efficiently severed in this way.

The cable-cutting unit can have a propelling charge, for example, which is disposed or disposable in the cable-cutting device and can be configured for activating the cutter. The cutter by way of the propelling charge can be activated with as little temporal delay as possible.

According to one embodiment, the cable duct can extend between a base wall and a cover wall of the housing. A first recess in the cover wall herein can form a first end of the cable duct, and a second recess in the base wall, opposite the first recess, can form a second end of the duct.

For example, the first recess and the second recess can in each case have a U-shape that is open toward a lateral edge of the base wall and toward a lateral edge of the cover wall. By way of this embodiment, the cable can be readily received for guiding in the cable-cutting unit.

The slide can be configured to be mounted at a first end on the cover wall, and to be mounted at a second end which is opposite the first end on the base wall, so as to be displaceable between the first position and the second position. The cable-cutting unit according to this embodiment can be implemented so as to be particularly functional and by way of a minor investment in materials.

The slide can in particular have a U-shape which encompasses the cable duct. The cable-cutting device can be disposed on an external side of a wall of the slide that represents a leg of the U-shape. In this embodiment of the slide, the cable-cutting device in the first position of the slide can be suitably disposed so as to be opposite the cable duct, and the displacement function of the slide can be simultaneously guaranteed in an optimal manner.

The housing can furthermore have a rear wall that connects the base wall and the cover wall. The rear wall on an internal wall that is directed toward an interior of the housing can have at least one groove, extending transversely to the cable duct, for guiding a further wall of the slide that represents a further leg of the U-shape between the first position and the second position. The slide by way of this embodiment of the housing can be reliably repositioned between the first and the second position.

According to a particular embodiment, the cable-cutting unit can have a further cable-cutting device. The further cable-cutting device can be disposed or be disposable on the slide so as to be adjacent to the cable-cutting device and opposite the cable duct in relation to a longitudinal extent of the cable duct. A redundant potential for severing the cable is thus advantageously created.

Furthermore, the housing can have an intermediate wall having a third recess, said intermediate wall being disposed between the base wall and the cover wall and running parallel with the base wall and the cover wall. Accordingly, the slide can have an opening for engaging through the intermediate wall, said opening extending transversely to the cable duct. The cable-cutting device herein can be disposed or disposable on the slide between the cover wall and the intermediate wall and the further cable-cutting device can be disposed or disposable on the slide between the intermediate wall and the base wall. Canting of the slide in the sliding movement between the first and the second position can be avoided by way of this embodiment.

A cable-cutting system for a cable winch has the following features: a cable-cutting unit according one of the embodiments stated in the aforementioned; and a cable-unwinding installation which is mechanically and/or electrically coupled or coupleable to the cable-cutting unit and is configured to initiate the unwinding of the cable as a response to a displacement of the slide of the cable-cutting unit from the first position to the second position.

The cable-unwinding installation can have a control apparatus, a drive for unwinding the cable, and optionally a further drive for displacing the slide between the first and the second position. The control apparatus can be configured to provide the drive, for the unwinding of the cable, with an unwinding signal for unwinding a residual length of the cable after the cable has been severed. In the case of the further drive being dispensed with, the slider can also be moved manually between the first and the second position.

A method for operating a cable-cutting unit for a cable winch, wherein the cable-cutting unit has at least one cable-cutting device for cutting a cable running through the cable-cutting unit, a slide, and a housing having a cable duct for guiding the cable running through the cable-cutting unit, wherein the cable-cutting device is disposed or disposable on the slide, and the slide is disposed or disposable on the housing, comprises the following step: displacing the slide transversely to the cable duct between a first position and a second position.

Displacing the slide can generally be understood as moving the slide.

The object on which the invention is based can be achieved rapidly and efficiently also by way of this embodiment variant of the invention in the form of a method.

According to one embodiment, the method can comprise a step of providing an activation signal to the cable-cutting unit in order for the cable-cutting device to be activated for severing the cable. The step of providing can be carried out prior to the step of displacing. The severing of the cable can be triggered remotely and be controlled in a temporally optimal manner by way of this embodiment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
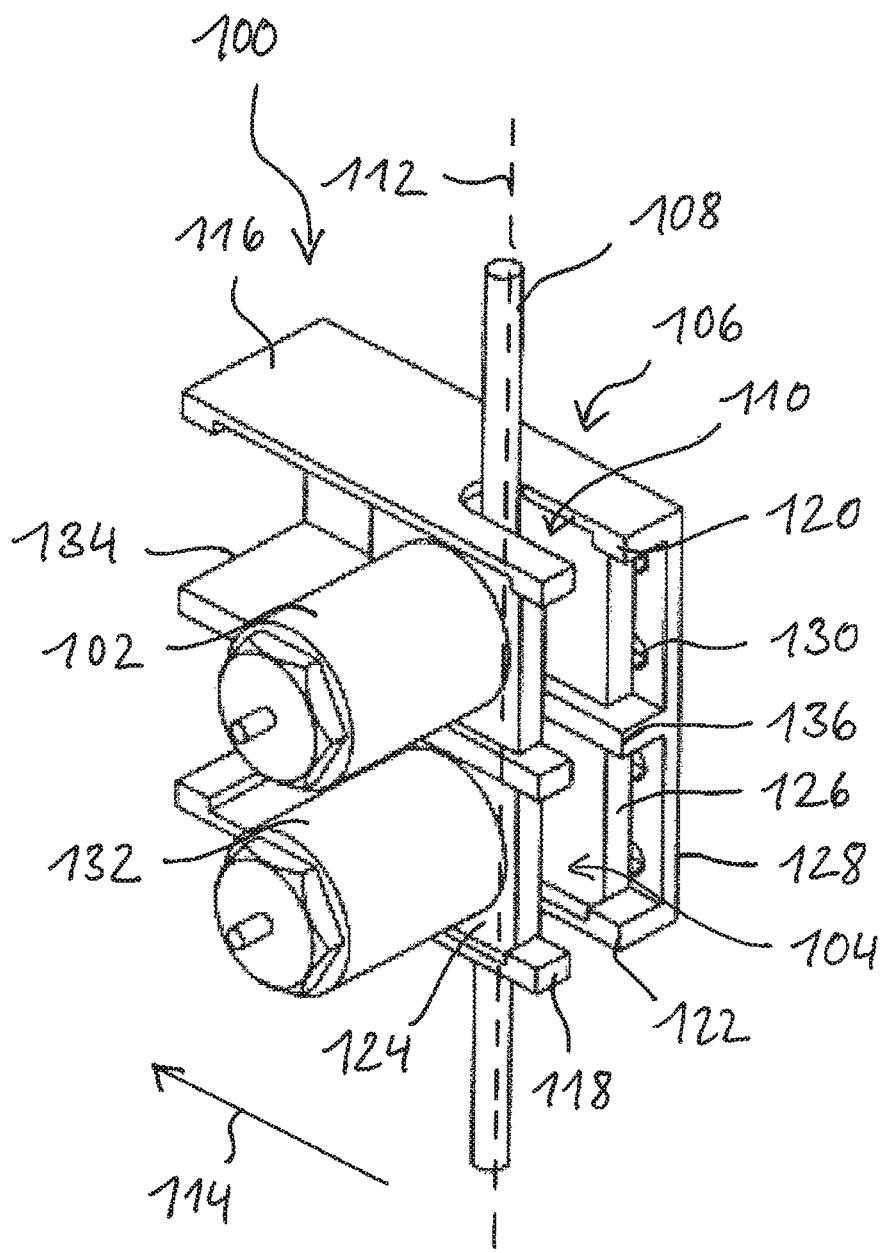
FIG. 1 shows an illustration of a cable-cutting unit for a cable winch according to an exemplary embodiment of the present invention.

FIG. 1 shows a perspective illustration of a cable-cutting unit 100 for a cable winch according to an exemplary embodiment of the present invention. The cable-cutting unit 100 can be used in a rescue helicopter for example in combination with a cable winch or a rescue winch, respectively.

The cable-cutting unit 100 comprises a cable-cutting device 102, a slide 104, and a housing 106. The cable-cutting unit 100 can be fastened to the rescue helicopter or to a rescue winch that is installed on the rescue helicopter, respectively, by means of the housing 106.

The cable-cutting device 102 is configured for severing a cable 108 running through the cable-cutting unit 100, for example when the cable 108 or a hook that is fastened to the cable 108 has caught on the ground. The cable-cutting device 102 is disposed on the slide 104 which in turn is disposed on the housing 106 so as to be displaceable or repositionable, respectively, between a first position and a second position. The housing 106 forms a cable duct 110 for guiding the cable 108 through the cable-cutting unit 100. The cable 108 is guided through the cable-cutting unit 100 from the top to the bottom along a longitudinal extent 112 of the cable duct 110 that in the illustration is identified by means of a dashed line.

The slide 104 in the illustration in FIG. 1 is shown in a first position. In this first position, the cable-cutting device 102 that is disposed on the slide 104 in relation to the longitudinal extent 112 of the cable duct 110 is disposed so as to be laterally opposite the cable duct 110 and the cable 108 that is guided in the cable duct 110.

The exemplary cable-cutting device 102 shown in FIG. 1 has a cylindrical shape. A cutter for severing the cable 108 and a propelling charge for activating the cutter are disposed in an interior of the cable-cutting device 102. An end side of the cable-cutting device 102 that is adjacent to the slide 104 has an opening for passing the activated cutter into the cable duct 110 in order for the cable 108 to be reached and severed by a blade of the cutter. If the cutter is activated in the first position of the slide 104 shown in FIG. 1, said cutter penetrates the cable duct 110 laterally and severs the cable 108.

Upon severing the cable 108, the slide 104, for further releasing the cable, can be repositioned from the first position to a second position in a displacement direction 114 that runs transversely to the cable duct 110 and in FIG. 1 is identified by means of an arrow. In the second position the cable-cutting device 102 is laterally offset in relation to the cable duct 110 and to the remaining cable 108 guided in the cable duct 110 in relation to the longitudinal extent 112 of the cable duct 110.

In the case of the exemplary embodiment of the cable-cutting unit 100 shown in FIG. 1 the housing 106 is delimited upwardly by a cover wall 116 and downwardly by a base wall 118. The cover wall 116 and the base wall 118 are disposed so as to be mutually parallel, are of identical size, and each have an elongate rectangular shape.

The cable duct 110 extends between the cover wall 116 and the base wall 118 of the housing 106. A first recess 120 in the cover wall 116 herein forms a first end of the cable duct 110, and a second recess 122 in the base wall 118, opposite the first recess 120, forms a second end of the cable duct 110.

The recesses 120, 122 each have an elongate shape and from short lateral edges of the cover wall 116 and of the base wall 118 extend in the direction of a respective central region of the cover wall 116 and of the base wall 118. The recesses 120, 122 have a U-shape. The recesses 120, 122 enable the cable 108 to be introduced laterally into the cable duct 110 of the cable-cutting unit 100 at the open end of the U-shaped recesses 120, 122. The recesses 120, 122 herein are of sufficient size or length, respectively, in order to guarantee that the cable 108 guided in the cable duct 110 is opposite the cable-cutting device 102 in the first position of the slide 104.

The slide 104 in the case of the exemplary embodiment of the cable-cutting unit 100 shown in FIG. 1 has a U-shape that encompasses the cable duct 110, a quasi lying U-shape. An opening of the U-shaped slide 104 herein is directed in the direction of the lateral edges of the cover wall 116 and of the base wall 118 that form the recesses 120, 122, in order to guarantee that the cable 108 is received in the cable duct 110.

In order for the slide 104 to be displaced in the displacement direction 114, a first long side of the cover wall 116 and a first long side of the base wall 118 frame a wall 124 that represents a first leg of the U-shape of the slide 104 or mount, respectively, the wall 124 so as to be displaceable. Accordingly, a second long side of the cover wall 116 and a second long side of the base wall 118 frame a further wall 126 that represents a second leg of the U-shape of the slide 104 or mount, respectively, the further wall 126 so as to be displaceable.

A wall of the housing 106 that connects the second long side of the cover wall 116 and the second long side of the base wall 118 forms a rear wall 128 of the housing 106. In the displacement of the slide 104 in the displacement direction 114 between the first and the second position, the further wall 126 of the slide 104 slides along an internal side of the rear wall 128 that faces the slide 104. In order for the slide 104 to be guided without canting, the rear wall 128 on the internal side has at least one groove 130 that extends transversely to the cable duct 110. In the case of the exemplary embodiment of the cable-cutting unit 100 shown in FIG. 1 the internal side of the rear wall 128 has a plurality of four grooves 130.

The cable-cutting device 102 is disposed on an external side of the wall 124 of the slide 104, i.e. on a side of the wall 124 that faces away from the cable duct 110. The exemplary embodiment of the cable-cutting unit 100 shown in FIG. 1 additionally has a further cable-cutting device 132. The further cable-cutting device 132 is implemented in a manner identical to that of the cable-cutting device 102 and is disposed so as to be flush below the cable-cutting device 102, adjacent to the cable-cutting device 102, on the external side of the wall 124 of the slide 104. The further cable-cutting device 132, like the cable-cutting device 102, possesses a cutter which by a propelling charge can be activated in order for the cable 108 to be severed. The exemplary cable-cutting unit 100 shown in FIG. 1 thus possesses a redundant potential for severing the cable 108.

The exemplary cable-cutting unit 100 shown in FIG. 1 furthermore has an intermediate wall 134. The intermediate wall 134 extends transversely to the rear wall 128 at half the height between the cover wall 116 and the base wall 118 and runs parallel with the cover wall 116 and the base wall 118. The intermediate wall 134 has a third recess 136 for receiving the cable 108 in the cable duct 110, said third recess 136 being shaped in an identical manner to that of the recesses 120, 122. In order for the displaceability of the slide 104 to be guaranteed or supported, respectively, the slide 104 has an opening, extending transversely to the cable duct 110, for engaging through the intermediate wall 134.

In the case of the variant of the cable-cutting unit 100 shown in FIG. 1, the cable-cutting device 102 is disposed on the slide 104 between the cover wall 116 and the intermediate wall 134, and the redundant further cable-cutting device 132 is disposed on the slide 104 between the intermediate wall 134 and the base wall 118.

In summary, FIG. 1 shows a variant of the cable-cutting unit 100 introduced herein, having two cable-cutting devices 102, 132 having a lateral opening, said cable cutting devices 102, 132 in relation to the longitudinal extent 112 of the cable duct 110 being assembled on the slide 104 so as to be lying behind one another. The slide 104 is laterally displaceable in the displacement direction 114. After at least one of the cable-cutting devices 102, 132 has been triggered, the path of the cable 108 in the first position of the slide 104 shown in FIG. 1 is blocked by the dropped cutter. As the slide is displaced to the second position, the cutter is moved laterally away from the new cable end. The cable 108 is then no longer blocked and can be respectively unwound or unreeled downward by the winch.

The following FIGS. 2 to 9 show illustrations in order to explain a functional sequence in an exemplary operation of the cable-cutting installation 100 of a cable winch according to exemplary embodiments of the present invention, said cable-cutting installation being introduced in FIG. 1. FIGS. 2 to 9 in an exemplary manner show four stations of the functional sequence. At each station the cable-cutting installation 100 is shown once in cross section and once in a plan view from the front. Specifically, FIGS. 2, 4, 6, and 8 show the cable-cutting installation 100 in cross section, and FIGS. 3, 5, 7, and 9 show the cable-cutting installation 100 in a plan view.

Figure 2:
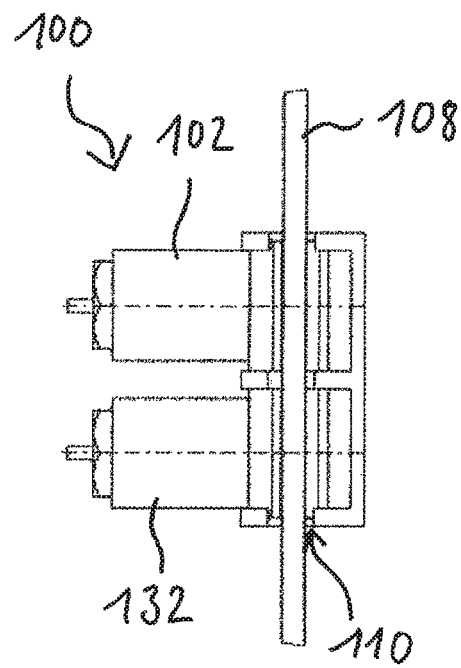
FIGS. 2 to 9 show illustrations for explaining a functional sequence of a cable-cutting unit for a cable winch according to exemplary embodiments of the present invention.
Figure 3:
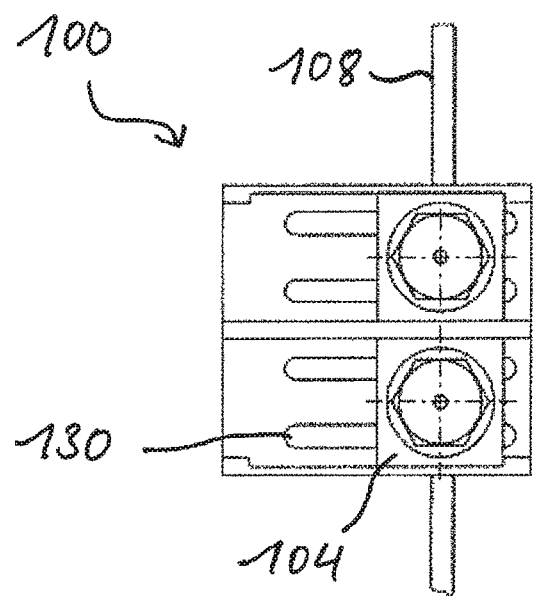

FIGS. 2 and 3 show a standard situation of the cable-cutting installation 100. The cable 108 in the cable duct 110 runs through the cable-cutting devices 102, 132. The cutters of the cable-cutting devices 102, 132 are not triggered and are in each case located in an internal region of the housings of the cable-cutting devices 102, 132. The slide 104 is in the first position, also shown in FIG. 1, in which the cable-cutting devices 102, 132 that are disposed on the slide are positioned so as to be exactly opposite the cable 108.

Figure 4:
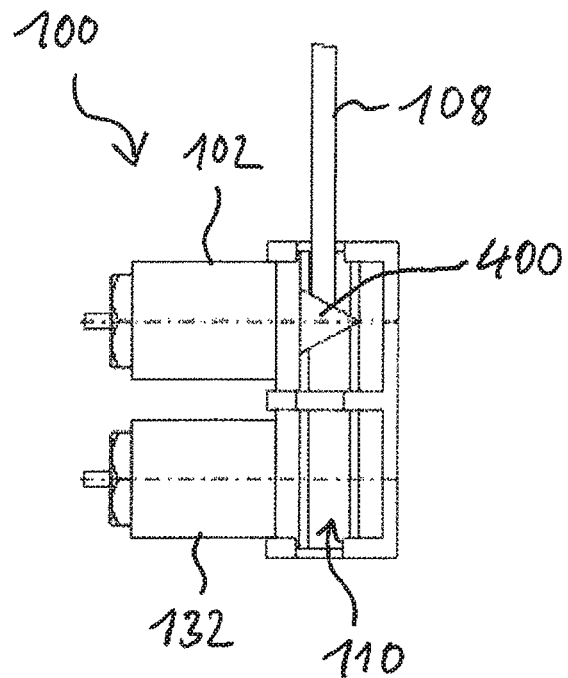
Figure 5:
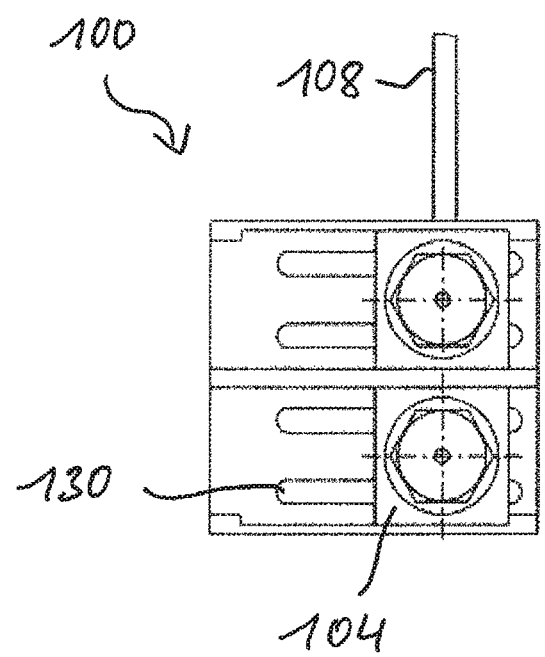

FIGS. 4 and 5 show a functional state of the cable-cutting installation 100 at a point in time in the functional sequence once the cable-cutting device 102 has been triggered. Propelled by an ignition of a propelling charge that is disposed in the cable-cutting device 102, a cutter 400 has been driven from the interior of the cable-cutting device 102 laterally into the cable duct 110 and has severed the cable 108. A portion of the cable 108 that is below the cut has dropped out of the cable-cutting unit 100. The dropped cutter 400 remain stationary in the cable duct 110 and blocks a path of the remaining cable 108 in the cable duct 110.

In the station in the functional sequence illustrated in FIGS. 4 and 5 the new cable end is blocked by the deployed cutter 400 and cannot be reached by an operator of a winch assigned to the cable-cutting installation 100. By virtue of the position of the winch and of the situation, a cable change or an intervention in the cable profile by the operator in the flight of the helicopter that has the winch is fundamentally impossible.

Figure 6:
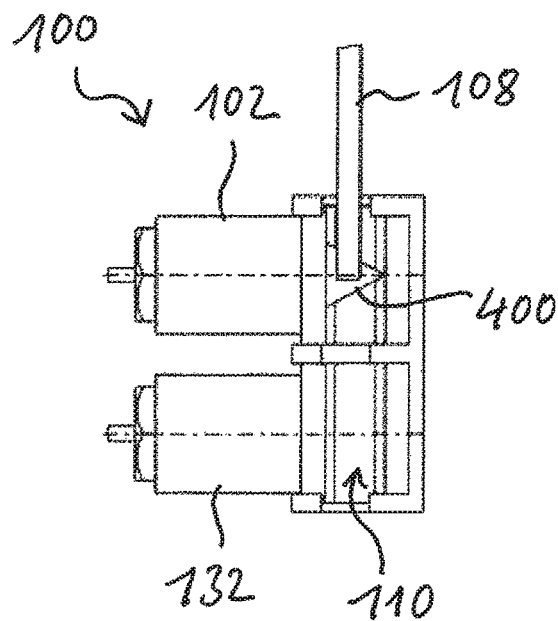
Figure 7:
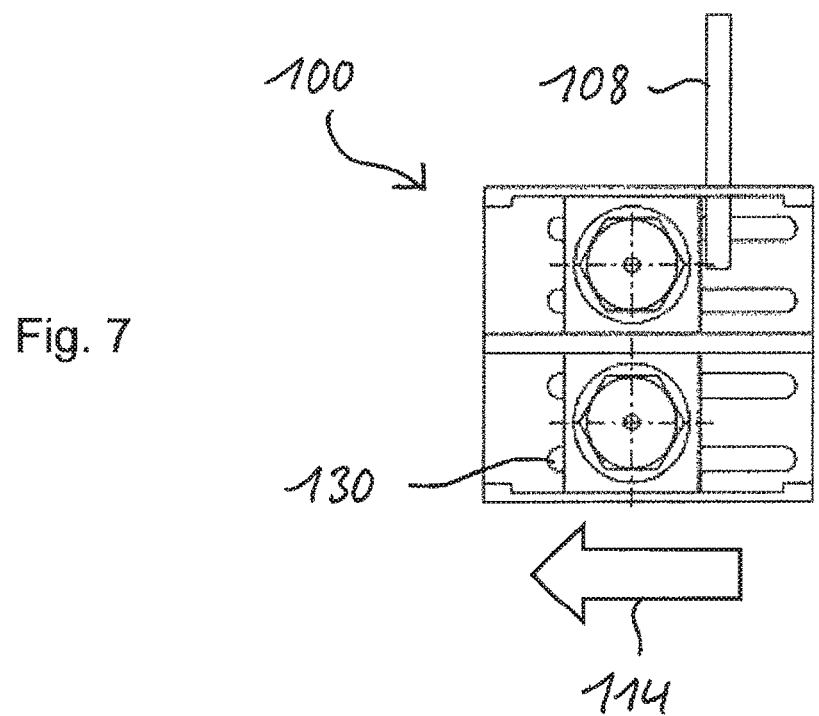

The solution to this situation by means of the use of the displaceable slide 104 introduced herein is shown in FIGS. 6 and 7. The slide 104 herein is shown in a second position at a later point in time in the functional sequence. The slide 104 has been displaced or repositioned, respectively, in the displacement direction 114 from the first position to the left into the second position. The cable-cutting devices 102, 132 are now positioned so as to be laterally offset in relation to the cable duct 110 and to the remaining cable 108 that is guided in the cable duct 110. The blockage of the cable path by the cutter 400 is cancelled in the second position of the slide 104. The cable 108 now runs beside the cable-cutting devices 102, 132, and can be moved out of the cable duct 110 in a downward manner.

Figure 8:
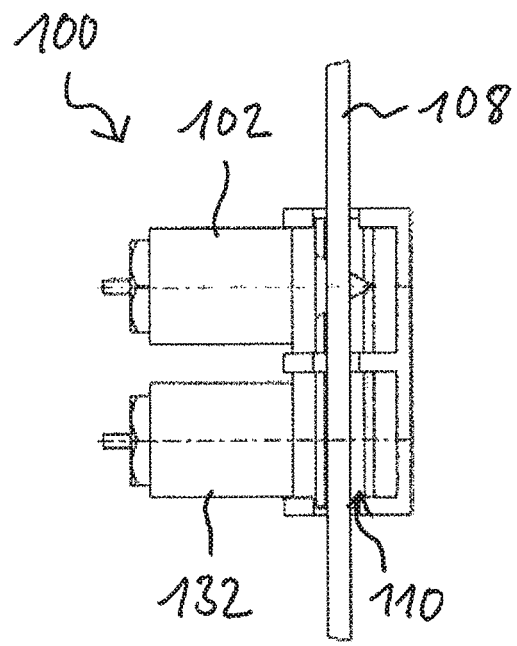
Figure 9:
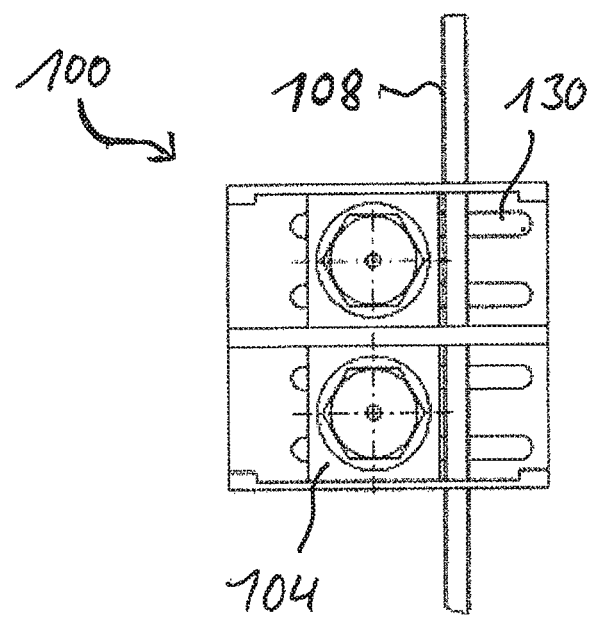

FIGS. 8 and 9 show the remaining cable 108 in the state in which the latter has been moved out of the lower end of the cable duct 110.

According to one exemplary embodiment, unwinding of the cable 108 is performed automatically, i.e. without any influence by the operator or user of the assigned cable winch, respectively. The cable 108 is run out so far that the cable end can be readily gripped by the operator and an emergency hook can be fitted.

The procedure for releasing and unwinding the cable 108 is triggered by the operator or alternatively by the pilot of the rescue helicopter that comprises the cable winch.

Figure 10:
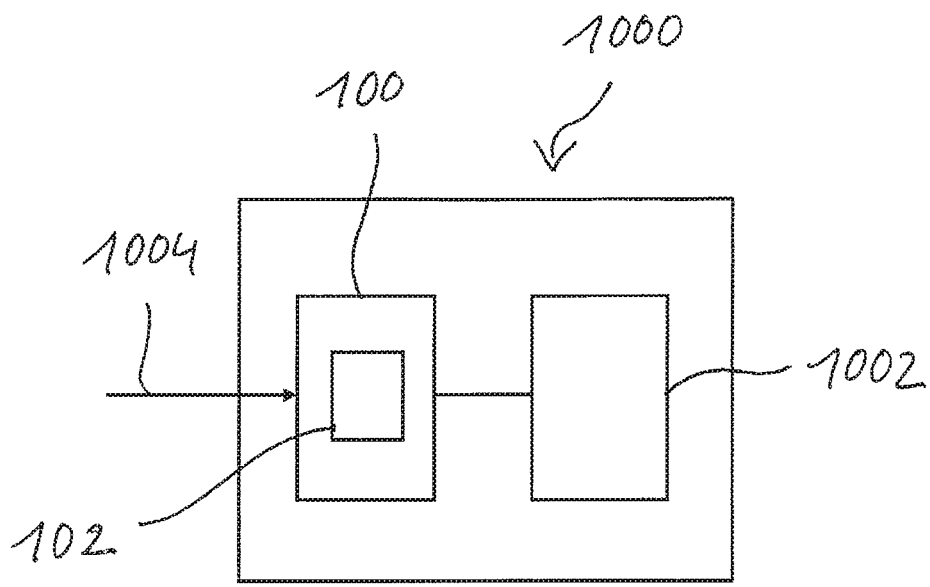
FIG. 10 shows a schematic illustration of a cable-cutting system for a cable winch according to an exemplary embodiment of the present invention.

FIG. 10 shows a schematic illustration of a cable-cutting system 1000 for a cable winch according to one exemplary embodiment of the present invention. The cable-cutting system 1000 comprises an exemplary embodiment of the cable-cutting unit 100 having at least the cable-cutting device 102 and a cable-unwinding installation 1002. The cable-cutting unit 100 and the cable-unwinding installation 1002 are part of cable winch and are mechanically and/or electrically intercoupled.

The cable-cutting device 102 is configured to sever a cable of the cable winch, for example by deploying a cutter from a housing of the cable-cutting device 102, in response to an activation signal 1004.

The cable-unwinding installation 1002 is configured to initiate unwinding of the cable in response to a displacement of a slide of the cable-cutting unit 100 from a first position to a second position.

Figure 11:
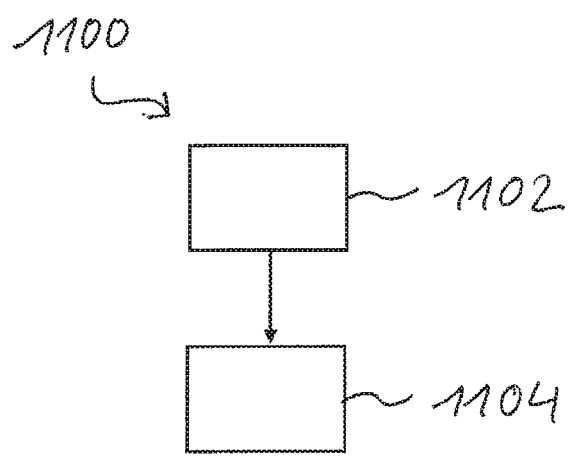
FIG. 11 shows a flow diagram of a method for operating a cable-cutting unit for a cable winch according to an exemplary embodiment of the present invention.

FIG. 11 shows a flow diagram of an exemplary embodiment of a method 1100 for operating a cable-cutting unit for a cable winch according to an exemplary embodiment of the present invention. The method 1100 can be carried out for operating the exemplary cable-cutting unit shown in FIGS. 1 to 10.

In a providing step 1102 an activation signal for activating a cable-cutting device of the cable-cutting unit is provided to the cable-cutting unit. The activation of the cable-cutting device effects that a cutter is driven out of the cable-cutting device laterally into a cable duct of the cable-cutting unit and severs a cable that is guided in the cable duct.

In a displacing step 1104 a slide of the cable-cutting unit that supports the cable-cutting device is displaced transversely to the cable duct between a first position and a second position in order for the cable-cutting device to be positioned in an offset manner in relation to the cable duct and to thus cancel a blockage of the cable duct by the cutter that has dropped from the cable-cutting device.

The exemplary embodiments described and shown in the figures have been chosen only by way of example. Different exemplary embodiments can be combined with one another entirely or in the context of individual features. One exemplary embodiment can also be expanded by features of a further exemplary embodiment.

Furthermore, method steps according to the invention can be repeated and be carried out in a sequence that differs from the sequence described.

Where an exemplary embodiment comprises an "and/or" conjunction between a first feature and a second feature, this is intended to be read to mean that the exemplary embodiment has both the first feature and the second feature in accordance with one embodiment and either just the first feature or just the second feature in accordance with a further embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cable-cutting unit for a cable winch, the cable-cutting unit comprising:
at least one cable-cutting device for severing a cable running through the cable-cutting unit;
a slide; and
a housing having a cable duct for guiding the cable running through the cable-cutting unit, wherein the cable-cutting device is disposed or disposable on the slide and the slide is disposed or disposable on the housing so as to be displaceable transversely to the cable duct between a first position and a second position,
wherein in the first position of the slide the cable-cutting device in relation to a longitudinal extent of the cable duct is disposed so as to be opposite the cable duct, and in the second position of the slide the cable-cutting device in relation to the longitudinal extent of the cable duct is disposed so as to be laterally offset in relation to the cable duct.

2. The cable-cutting unit as claimed in claim 1, wherein the cable-cutting device has a cutter which is configured for penetrating the cable duct laterally in order for the cable to be severed as a response to an activation from an internal region of the cable-cutting device.

3. The cable-cutting unit as claimed in claim 2, further comprising a propelling charge which is disposed or disposable in the cable-cutting device and is configured for activating the cutter.

4. The cable-cutting unit as claimed in claim 1, wherein the cable duct extends between a cover wall and a base wall of the housing, wherein a first recess in the cover wall forms a first end of the cable duct, and a second recess in the base wall, opposite the first recess, forms a second end of the cable duct.

5. The cable-cutting unit as claimed in claim 4, wherein the first recess and the second recess have in each case a U-shape toward a lateral edge of the cover wall and toward a lateral edge of the base wall.

6. The cable-cutting unit as claimed in claim 4, wherein the slide is configured by way of a first end of the slide to be mounted on the cover wall, and by way of a second end of the slide, which second end is opposite the first end, to be mounted on the base wall, so as to be displaceable between the first position and the second position.

7. The cable-cutting unit as claimed in claim 4, wherein the housing has an intermediate wall having a third recess, said intermediate wall being disposed between the cover wall and the base wall and running parallel with the cover wall and the base wall, wherein the slide has an opening for engaging through the intermediate wall, said opening extending transversely to the cable duct, and wherein the cable-cutting device is disposed or disposable on the slide between the cover wall and the intermediate wall and the further cable-cutting device is disposed or disposable on the slide between the intermediate wall and the base wall.

8. The cable-cutting unit as claimed in claim 1, wherein the slide has a U-shape which encompasses the cable duct, wherein the cable-cutting device is disposed or disposable on an external side of a wall of the slide that represents a leg of the U-shape.

9. The cable-cutting unit as claimed in claim 8, wherein the housing has a rear wall that connects the base wall and the cover wall, said rear wall on an internal side that is directed toward an interior of the housing having at least one groove, extending transversely to the cable duct, for guiding a further wall of the slide that represents a further leg of the U-shape between the first position and the second position.

10. The cable-cutting unit as claimed in claim 1, a further cable-cutting device is disposed or disposable on the slide so as to be adjacent to the cable-cutting device and opposite the cable duct in relation to a longitudinal extent of the cable duct.

11. A cable-cutting system for a cable winch, the cable-cutting system comprising:
   a cable-cutting unit according to claim 1; and
   a cable-unwinding installation which is mechanically and/or electrically coupled or coupleable to the cable-cutting unit and is configured to initiate the unwinding of the cable as a response to a displacement of the slide of the cable-cutting unit from the first position to the second position.

12. A method for operating a cable-cutting unit for a cable winch, the method comprising:
   providing the cable-cutting unit with at least one cable-cutting device for cutting a cable running through the cable-cutting unit, a slide, and a housing having a cable duct for guiding the cable running through the cable-cutting unit, wherein the cable-cutting device is disposed or disposable on the slide and the slide is disposed or disposable on the housing; and
   displacing the slide transversely to the cable duct between a first position and a second position,
   wherein in the first position of the slide the cable-cutting device in relation to a longitudinal extent of the cable duct is disposed so as to be opposite the cable duct, and in the second position of the slide the cable-cutting device in relation to the longitudinal extent of the cable duct is disposed so as to be laterally offset in relation to the cable duct.

13. The method as claimed in claim 12, further comprising providing an activation signal to the cable-cutting unit in order for the cable-cutting device to be activated for severing the cable, wherein providing the activation signal is carried out prior to said displacing the slide.

* * * * *